United States Patent
Haruna et al.

(10) Patent No.: US 7,413,197 B2
(45) Date of Patent: Aug. 19, 2008

(54) STEERING SKI DEVICE FOR SNOWMOBILE (75) Inventors: Kaoru Haruna, Iwata (JP); Takahik Kubota, Iwata (JP)

(73) Assignee: Yamaha Hatsudoki Kabushiki Kaisha (JP)

( * ) Notice: Subject to any disclaimer, the term of this patent is extended or adjusted under 35 U.S.C. 154(b) by 0 days.

(21) Appl. No.: 10/601,093

(22) Filed: Jun. 20, 2003

(65) Prior Publication Data

US 2004/0051275 A1 Mar. 18, 2004

(30) Foreign Application Priority Data

Jun. 20, 2002 (JP) ............... 2002-180631

(51) Int. Cl.
*B62B 17/02* (2006.01)
(52) U.S. Cl. ....................................... 280/28
(58) Field of Classification Search ........... 280/601, 280/28, 609, 28.14, 21.1, 602, 845, 605, 280/28.11, 22.1, 16, 17; D12/7; 180/182
See application file for complete search history.

(56) References Cited

U.S. PATENT DOCUMENTS

| | | | | |
|---|---|---|---|---|
| 3,605,926 A | * | 9/1971 | Leonawicz | 280/16 |
| 3,718,341 A | * | 2/1973 | Westberg | 280/28 |
| 3,732,939 A | * | 5/1973 | Samson | 280/28 |
| 3,850,440 A | * | 11/1974 | Reedy et al. | 280/28 |
| 3,856,318 A | * | 12/1974 | Hollenbeck | 280/28 |
| 5,040,818 A | * | 8/1991 | Metheny | 280/609 |
| 5,344,168 A | * | 9/1994 | Olson et al. | 280/28 |
| 5,443,278 A | * | 8/1995 | Berto | 280/28 |
| 5,673,772 A | * | 10/1997 | Martin | 188/6 |
| 5,700,020 A | * | 12/1997 | Noble | 280/28 |
| 5,853,061 A | | 12/1998 | Yamamoto et al. | |
| 5,931,481 A | * | 8/1999 | Hoffman | 280/28.11 |
| 6,102,413 A | * | 8/2000 | Khennache et al. | 280/28 |
| 6,308,966 B1 | * | 10/2001 | Cook et al. | 280/28.11 |
| 6,378,889 B1 | | 4/2002 | Moriyama et al. | |
| 6,513,612 B2 | | 2/2003 | Moriyama et al. | |
| 6,520,512 B1 | * | 2/2003 | Lachance | 280/28 |
| 2001/0032744 A1 | | 10/2001 | Moriyama | |
| 2004/0227312 A1 | * | 11/2004 | Dick et al. | 280/28 |
| 2005/0017465 A1 | * | 1/2005 | Bergstrom | 280/28 |

FOREIGN PATENT DOCUMENTS

| | | |
|---|---|---|
| CA | 220836 | 7/1922 |
| CA | 232374 | 7/1923 |

(Continued)

OTHER PUBLICATIONS

Examination page from the European Search Report from the European counterpart Application No. EP 03 01 3264.

*Primary Examiner*—Jeffrey J Restifo
(74) *Attorney, Agent, or Firm*—Knobbe, Martens, Olson & Bear, LLP (57) ABSTRACT

A ski for a snow vehicle includes a ski body, a ski mounting bracket, a keel, a wear bar, and a glide member. The ski body includes a generally horizontal surface that contacts the snow when the ski is in use. The ski mounting bracket is located on a top side of the ski body. The glide member depends from the ski and is mounted at a position lower than the lowest most part of the wear bar.

27 Claims, 11 Drawing Sheets

FOREIGN PATENT DOCUMENTS

| | | |
|---|---|---|
| CA | 253557 | 9/1925 |
| CA | 517048 | 10/1955 |
| CA | 897747 | 4/1972 |
| CA | 898310 | 4/1972 |
| CA | 954566 | 9/1974 |
| CA | 955292 | 9/1974 |
| CA | 987707 | 4/1976 |
| CA | 2018591 | 12/1991 |
| CA | 2195166 | 7/1998 |
| CA | 2304411 | 10/2000 |
| CA | 2 329 578 | 10/2001 |
| EP | 1 312 538 A1 | 5/2003 |
| JP | 2000-289684 | 10/2000 |

* cited by examiner

STEERING SKI DEVICE FOR SNOWMOBILE

PRIORITY INFORMATION

This application is based on and claims priority to Japanese Patent Application No. 2002-180631, filed Jun. 20, 2002, the entire contents of which is hereby expressly incorporated by reference.

BACKGROUND OF THE INVENTION

1. Field of the Invention

The present invention generally relates to skis for snow vehicles. More particularly, the present invention relates to steering skis that provide improved handling for such vehicles.

2. Description of the Related Art

The use of snowmobiles and similar snow vehicles has increased in popularity in recent years. These vehicles are used for utilitarian purposes, for casual recreational purposes, and for sporting purposes. The vehicles typically are adapted to travel across snow and/or ice and usually include at least one forward facing ski along with a driven belt track or other propulsion mechanism, e.g., wheels. The forward-facing ski can be directed leftward or rightward by a steering handle to alter the direction of the snowmobile.

Typically, snowmobile steering skis are constructed to have a plate-like ski body, which is formed integrally with a keel that protrudes from the bottom of the ski body toward the snow surface. This construction generally is superior to a completely flat ski. However, the desired construction of the ski body and the keel vary depending on the average snow conditions and/or the average load expected to be carried by the snowmobile.

While a snowmobile bearing the above-describe steering skis will perform reasonably well under average load and snow conditions, a specific snowmobile will seldom be operated in such conditions. For example, the load may be significantly smaller (e.g., a young adult) or larger (e.g., a heavy man pulling a large load) than the average expected load. Also, while certain snow conditions may be typical, a particular locality might receive vastly greater amounts of snowfall (e.g., an area subject to lake-effect snow) or may have little snow and a great deal of ice. Moreover, tracks from by other snow vehicles can create varying surface conditions which often can make steering somewhat challenging. As a result, a snowmobile with such skis will seldom perform as well as it could were the configuration of the skis better matched to the snow and surface conditions.

SUMMARY OF THE INVENTION

A need therefore exists for an improved steering ski. The ski preferably improves handling in a wide variety operating conditions, e.g., snow conditions. For this purpose, in accordance with one aspect of the present invention, the ski provides a glide member that is adaptable to the prevailing operating conditions.

In accordance with this aspect of the present invention, there is provided a ski for a snow vehicle. The ski comprises a ski body, a ski mounting bracket, at least one wear bar, and at least one glide member. The ski body includes a generally horizontal bottom surface that contacts the snow when the ski is in use. The ski mounting bracket is located on a top side of the ski body and the ski mounting bracket incorporates a pivot point where the ski is attached to the snow vehicle. The wear bar is disposed on the bottom side of the ski body, and the glide member is positioned at least as low as the lowest-most part of the wear bar.

Another aspect of the present invention involves a steerable ski system for a snow vehicle. The ski system comprises at least one ski body, a ski mounting bracket, a front suspension member, a wear bar, and a glide member. The ski body is positioned below a front portion of the snow vehicle and the ski body has a generally horizontal bottom surface that contacts the snow when the ski is in use. A ski mounting bracket is located on a top side of the ski body and the ski mounting bracket defines a pivot point. The ski is mounted to the snow vehicle through the front suspension member at the pivot point. A wear bar is disposed on the bottom side of the ski body. At least one glide member is also disposed on the bottom side of the ski body. The glide member has a length that is between one quarter and one half the distance from a lowest-most point of the glide member on the ski body to the center of the pivot point.

An additional aspect of the present invention involves a snowmobile. The snowmobile includes an engine, a transmission, a drive track, a steering mechanism, and at least one steering ski. The steering ski includes a ski body, a wear bar, and means for preventing the wear bar from entering depressions in the snow surface. The ski body has a generally horizontal surface that contacts the snow when the ski is in use.

BRIEF DESCRIPTION OF THE DRAWINGS

The above and other features, aspects and advantages of the present invention will now be described with reference to drawings that show preferred embodiments of such aspects and features of the invention. The illustrated embodiments, however, are intended to illustrate and not to limit the present invention. The drawings contain 11 figures in which:

FIG. 6b illustrates a cross-section view of the glide member of FIG. 6a taken along the section plane 6b-6b in FIG. 6a.

DETAILED DESCRIPTION OF THE PREFERRED EMBODIMENTS

Figure 1:
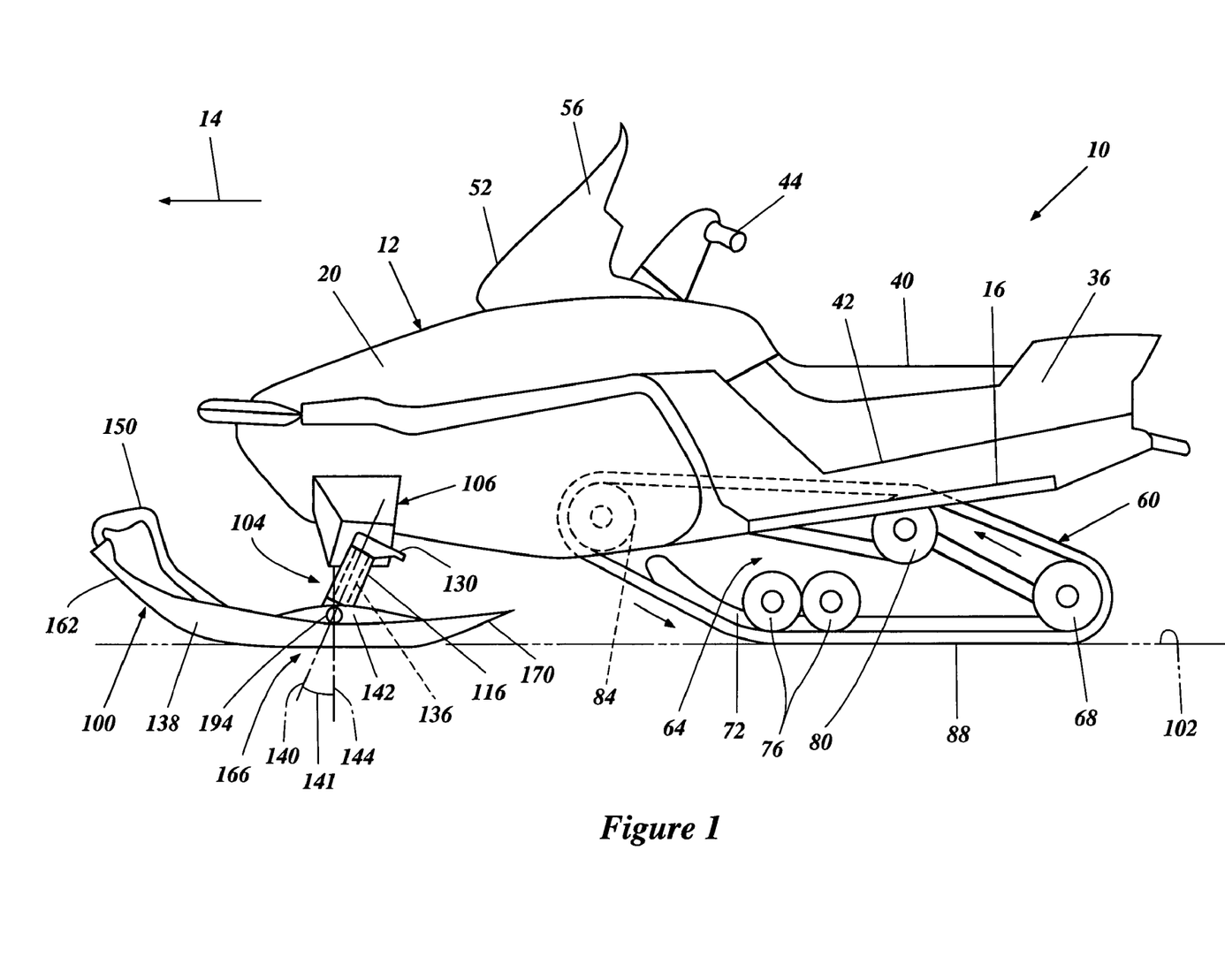
FIG. 1 is a side elevation view of a snowmobile that has a pair of steering skis configured in accordance with a preferred embodiment of the present invention.

With reference to FIG. 1, a snowmobile having a pair of steering skis constructed in accordance with a preferred embodiment of the present invention is identified generally by the reference numeral 10. An arrow 14 illustrates the general forward direction of the snowmobile. While described in the context of a snowmobile, it should be readily appreciated that many aspects and features of the present invention also can be used in a variety of other applications, such as all terrain vehicles having at least one ski, for instance. The snowmobile 10 includes a body assembly 12. The illustrated body assembly 12 includes a frame 16, an upper engine shroud 20, and a lower tray (not shown). The upper engine shroud 20 and the lower tray are connected to the frame 16. Together the upper engine shroud 20 and the lower tray define an engine compartment (not shown) that preferably houses an internal combustion engine (not shown) for powering the snowmobile 10.

The illustrated body assembly 12 further includes a rear portion 36 that accommodates a seat 40, which is adapted to seat one or more riders in a straddle fashion. A footrest 42 is provided on either side of the seat 40. A handlebar assembly 44 is positioned in front of the seat 40 for operation by the rider. As discussed in more detail below, the handlebar assembly 44 can be manipulated by the rider to steer the snowmobile 10. A fuel tank (not shown) is positioned generally between the handlebar assembly 44 and the seat 40.

The illustrated upper engine shroud 20 includes a raised portion 52 located in front of the handlebar assembly 44. The raised portion 52 carries a windshield 56, which generally shields the rider operating the snowmobile 10 from wind, snow, branches and other objects.

A carriage assembly 60 is supported at the rear portion 36 of the body 12 below the seat 40 by a rear suspension system 64. The carriage assembly 60 includes a rear pulley 68, a pair of guide rails 72 that carry a plurality of lower idler rollers 76, and an upper idler roller 80. The rear pulley 68 is coupled with the guide rails 72. A front pulley 84 is coupled with the engine and transmits the rotational energy of the engine to the carriage assembly 60 to propel the snowmobile 10, as discussed below.

The guide rails 72 and idler rollers 76, 80, along with the pulleys 68 and 84, form a path around which a drive track 88 is trained. The drive track 88 is driven by an output shaft (not shown) of the engine through a suitable variable belt-type transmission (not shown), as is well known in the art. The variable belt-type transmission is coupled with and drives the front pulley 84. The drive track 88 is suspended relative to the body 12 by a front suspension system (not shown) and a rear suspension system (not shown). The front and rear suspension systems are connected to the guide rails 72, which back up the drive track 88, as discussed above.

A pair of front skis 100, each having a construction described below, are designed to glide on a snow surface 102 and are disposed at a forward portion of the body 12. In particular, each of the front skis 100 is attached at a forward portion of the body 106 through a suspension mechanism 104 that preferably includes an upper A-arm, a lower A-arm, a strut 116, and a shock absorber. The outer end of each of the A-arms is connected to the strut 116 and the inner end of each of the A-arms is connected to the body 12. Each of the struts 116 is connected to the corresponding ski 100 and coveys steering movement of the handlebar assembly 44 to the corresponding ski 100 in a manner described below. Each of the shock absorbers is mounted between the strut 116 and the body 12. Thus, the left and right steering skis 100 are each suspended independently.

A steering system is also provided whereby a rider can direct the skis 100 by manipulating the handlebar assembly 44. The steering system includes a primary steering shaft that is coupled with the steering handle 44, an L-shaped link arm, left and right tie rods, left and right steering arms 130, and left and right secondary steering shafts. A first end of the L-shaped link arm is coupled with the lower end of the primary steering shaft in any suitable manner. Another end of the L-shaped link arm is coupled with an inner end of each of the tie rods. An outer end of each of the tie rods is connected to the corresponding steering arm 130. Each of the steering arms 130 is also connected to the corresponding secondary steering shaft. Preferably a steering ski support shaft 136 is provided whereby each of the secondary steering shafts is coupled with the corresponding ski 100. The steering support shafts 136 are configured to rotate about a steering axis 140 at a predetermined angle 141 with respect to a perpendicular axis 144.

Figure 2:
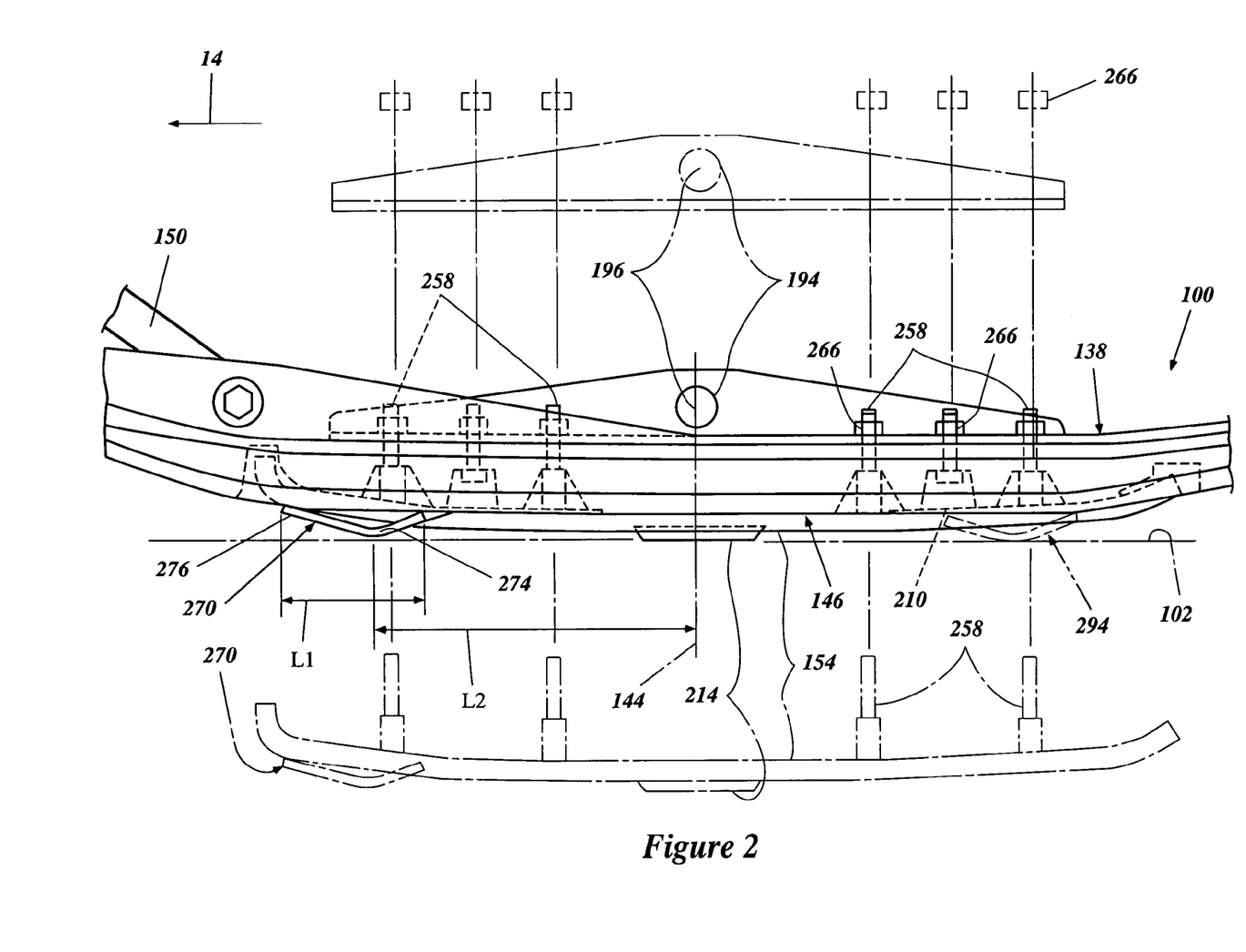
FIG. 2 is an exploded side elevational view of the steering ski shown in FIG. 1.

In the illustrated embodiment, as best seen in FIGS. 1 and 2, the ski 100 includes a ski body 138, the ski mounting bracket 142, and a keel 146. A handle 150 preferably is provided at a forward portion of the ski body 138. When provided, the handle 150 enables the rider to change of the direction of the ski 100 from the front of the snowmobile 10 without manipulating the handlebar assembly 44. In the illustrated embodiment, the ski mounting bracket 142 is located on the top side of the ski body 138, i.e., the side that does not normally contact the snow directly, and is coupled with the ski body 138 in a manner described below. The keel 146 protrudes from the ski body 138 so at to extend into the snow when the ski 100 is assembled and is attached to the snowmobile 10. A wear bar 154 is disposed generally below a lower surface of the keel 146 in a manner described below. The wear bar 154 preferably comprises iron, steel, carbide, or another suitable long-wearing material to extend the life of the keel 146 and the ski 100.

As best seen in FIG. 1, the ski body 138 includes an upturned leading portion 162, a snow contacting portion 166, and a rear portion 170. The snow contacting portion 166 preferably includes a generally horizontal bottom surface that extends outwardly from a central longitudinal, generally vertical plane of the ski 100 (i.e., extends to either side of the plane such that the ski has a width, preferably on the order of several inches). The upturned leading portion 162 advantageously is formed such that it curves upwardly with respect to the generally horizontal surface of the snow contacting portion 166. The rear portion 170 preferably also is curved upwardly with respect to the generally horizontal surface of the snow contacting portion 166. In the illustrated embodiment, the rear portion 170 curves upwardly to a lesser extent than does the upturned leading portion 162.

Figure 3:
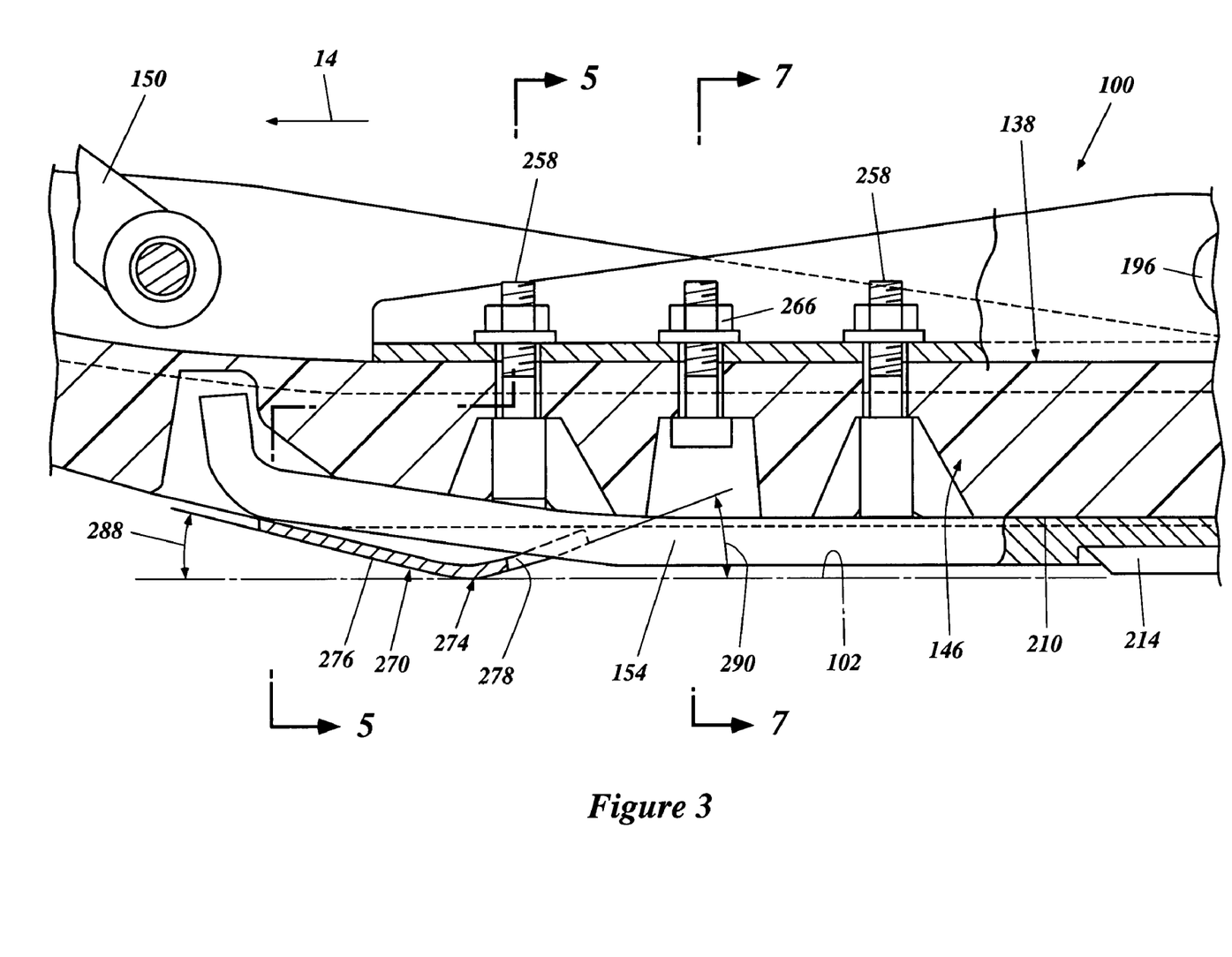
FIG. 3 is an enlarged sectioned view of a forward portion of the steering ski shown in FIGS. 1 and 2.
Figure 4:
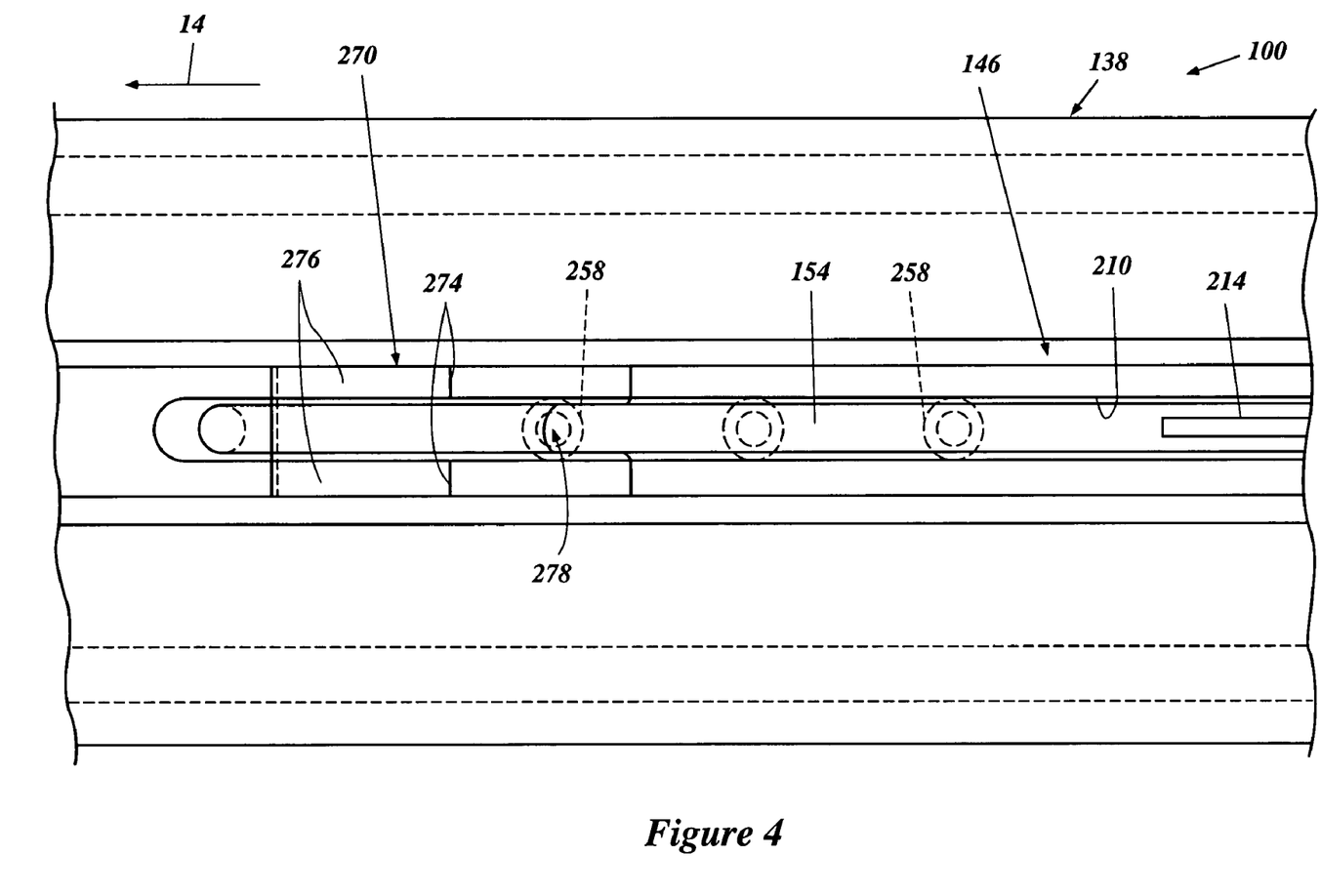
FIG. 4 is an enlarged bottom plan view of the steering ski shown in FIGS. 1, 2 and 3.
Figure 5:
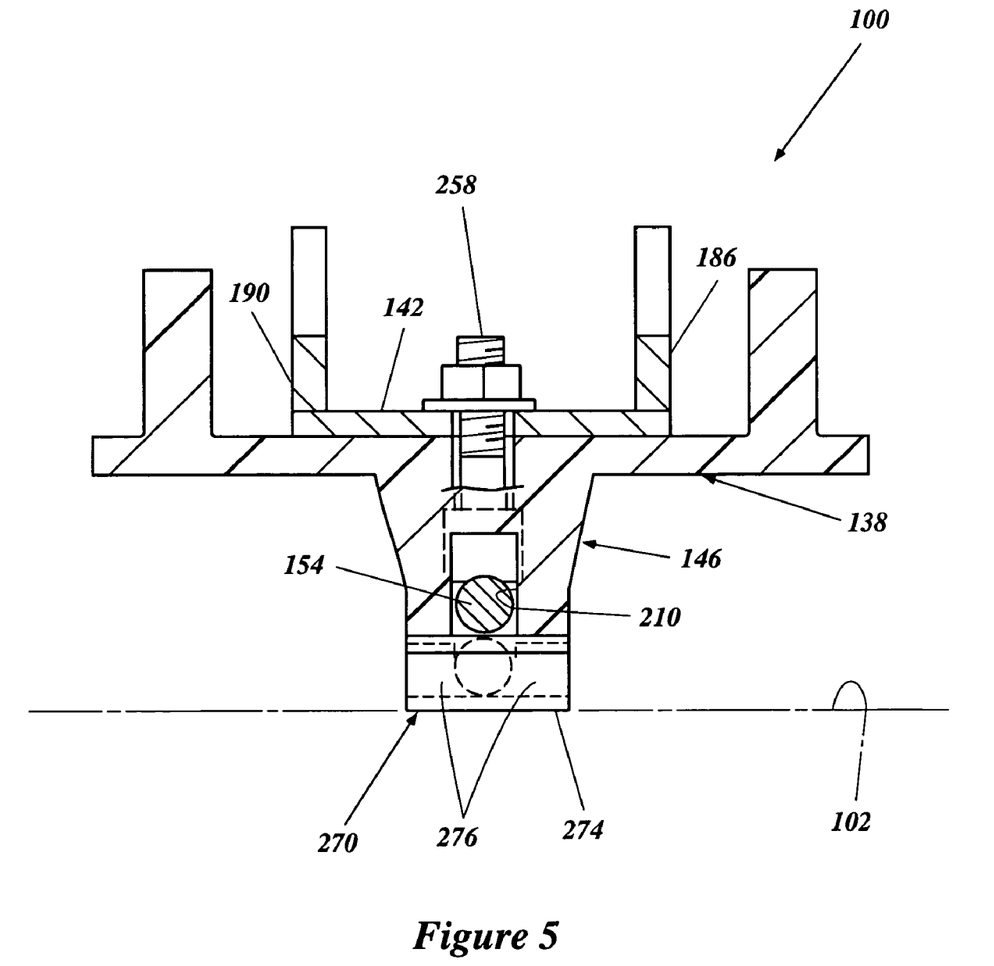
FIG. 5 is a cross-sectional view of the steering ski of FIG. 4 taken along the section plane indicated by the line 5-5 in FIG. 3.

FIGS. 2-7 illustrate further details of the construction of the skis 100. The ski mounting bracket 142, as shown in FIG. 5, includes a right-side wall 186 and a left-side wall 190. The right- and left-side walls 186, 190 preferably are longitudinally extending flanges on the lateral sides of the bracket 142. Thus, the right side-wall 186 and the left side-wall 190 form a channel that faces upwardly when the ski mounting bracket 142 is fixed to the ski body 138. Each of the right- and left-side walls 186, 190 is provided with a boss 194 that is configured to couple with and support the steering ski support shaft 136 through a mounting shaft 196. The ski mounting bracket 142 preferably is coupled with the ski body 138 by a plurality of fasteners. Any suitable fastener can be used to interconnect the bracket 142 and the ski body 138.

The keel 146 preferably extends along a substantial portion of the length of the snow contacting portion 166 and preferably is unitarily formed with the ski body 138. As best seen in FIG. 4, the keel 146 preferably includes a recess 210 that is formed on the bottom side of the keel 146 and extends longitudinally along at least a portion of the keel 146.

The wear bar 154 is at least partially received in the recess 210. In some arrangements, a cleat 214 is positioned along the length of the wear bar, e.g., near the center longitudinally of the wear bar 154. The cleat 214 preferably is a carbide tip that reduces side-slip when the snowmobile 10 is operated on ice or the like.

In the illustrated embodiment, a bolt 258 extends through the keel 146. The bolt 258 is coupled with the wear bar 154 by any suitable process (e.g., by welding) or means. Preferably a nut 266 is threaded onto the bolt 258 to connect together the wear bar 154 and the ski body 138. Other arrangements known in the art can be used to securely fasten the wear bar 154 to the ski body 138.

With reference to FIG. 2, at least one gliding member 270 is positioned on the lower side of the ski body 138. The gliding member 270 can reduce the tendency of the ski 100 to bite into preformed snow tracks and thus reduce the amount of steering force needed to operate the handlebar assembly 44. As a result, a rider can operate the snowmobile for a longer period of time before the rider becomes tired. Additionally, if well-defined ruts have been formed in the track where the snowmobile travels, darting may occur. Darting is the tendency of the snowmobile to follow in a well-defined track left by other snowmobiles rather than respond to the steering input of the rider. In such conditions, the gliding member 270 allows the ski 100 to more easily escape the previously defined ruts in the snow, which improves steering and makes travel more stable and less taxing.

Improved steering enhances the responsiveness of the snowmobile 10 to movement of the handlebar assembly 44, e.g., the handling of the snowmobile 10. In addition, incorporating the glide member 270 can improve steering and handling of the snowmobile 10 by preventing the wear bar from entering snow tracks from other snowmobile skis. Snow tracks from other snow vehicles can be more pronounced in icy environments leading to more difficult handling conditions. The glide member 270 prevents the wear bar 154 and, in some instances, the ski 100 from entering snow tracks from other snowmobile skis formed in icy environments.

Figure 6A:
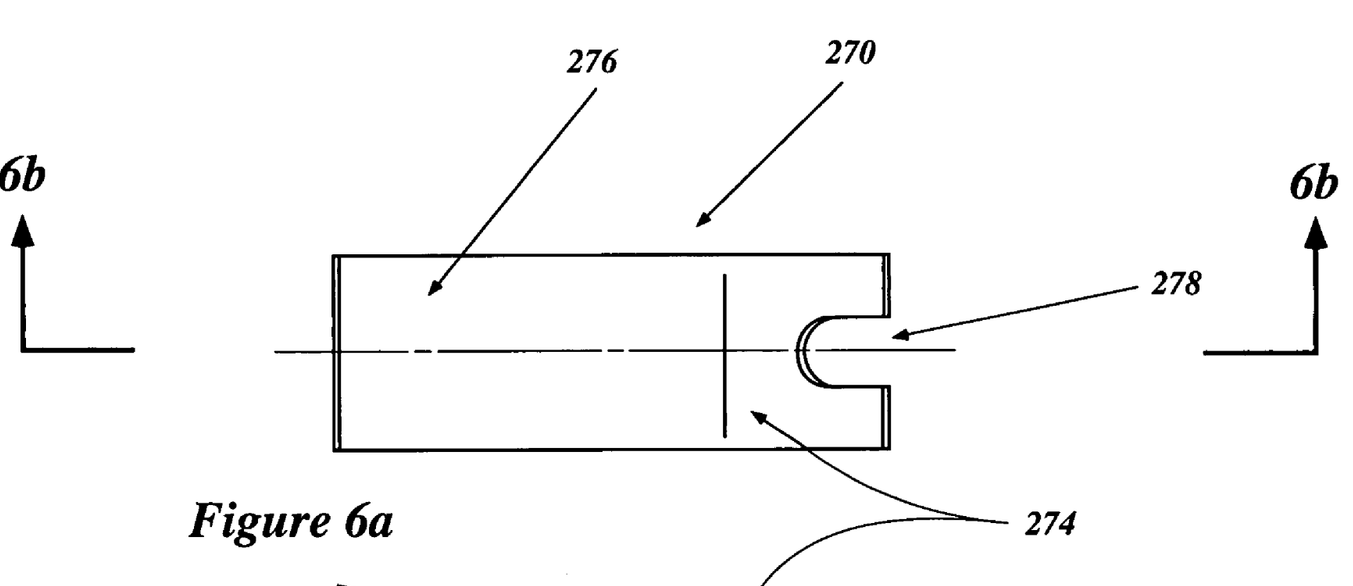
FIG. 6a illustrates a top plan view of a gliding member of the steering ski shown in FIGS. 2 and 3.
Figure 6B:
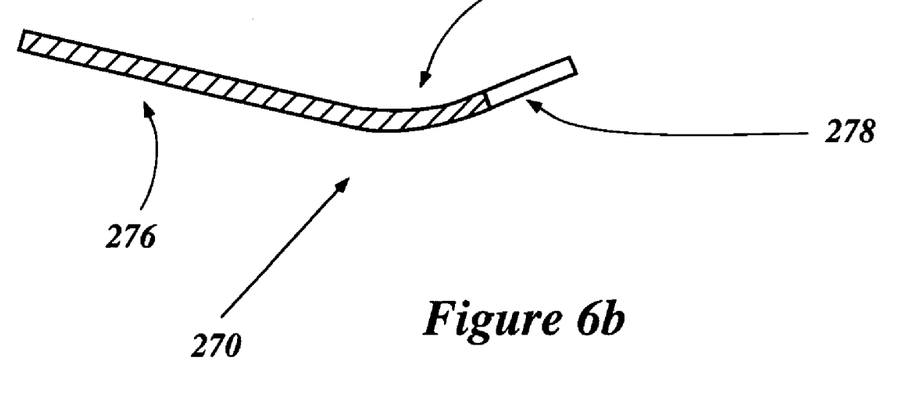

The gliding member 270 includes a raised projecting surface 276 that extends below the bottom of the ski body 138 and terminates at a lowest portion 274 of the glide member 270. In the illustrated embodiment, as best seen in FIG. 3, 6a and 6b, the glide member 270 is bent and thus curved downward at a transition between its raised projecting surface and a second surface. This bent region defines the lowest portion 274 of the glide member 270. The raised projecting surface 276 can be positioned in the direction of forward travel of the ski 100. The lowest portion 274 of the gliding member 270 can be at least as low as the lowest portion of the wear bar 154. The gliding member 270 preferably includes a cutout U section 278 on the second surface that allows the glide member to be mounted around a portion of the wear bar 154, as understood from FIGS. 4 and 6a. The width of the glide member preferably is as wide as the width of the keel 146. Predetermined angles that form the shape of the glide member will be described below.

The position of the glide member 270 can vary; however, various examples of gliding member positions can be seen in FIGS. 2-5. The lowest portion 274 of the gliding member 270 is located at a distance L2 from the lowest portion 274 of the glide member 270 to the perpendicular axis 144. An overall length L1 of the glide member 270 preferably is between one quarter of the distance L2 to one half of the distance L2. For example, the overall glide member length $L1=(\frac{1}{4}$ to $\frac{1}{2})*L2$. This length-to-position equation allows for improved steering and improved handling of the snowmobile 10.

The overall shape of the glide member 270 preferably is dictated by two predetermined angles. As understood from the example illustrated in FIG. 3, a first predetermined angle 288 positions the raised projecting surface 276 (e.g., the forward portion of the glide member 270 in the illustrated example) in an upward direction. A second predetermined angle 290 positions the second surface (e.g., the rearward portion of the glide member 270 in the illustrated example) in an upward direction. Preferably the first angle 288 is less than the second angle 290, i.e. (288<290). The predetermined angles 288 and 290 along with the mounting location and the length of the glide member 270 contribute to providing the snowmobile 10 with improved handling in all operating conditions.

A rear glide member 294 can be positioned on the lower side of the ski body 138 to the rear of the perpendicular axis 144 in addition or in the alternative to the glide member 270. The rear glide member preferably is configured in accordance with the above description of the front glide member 270 and can be the same size and shape or differ in size and shape from the front glide member 270.

FIG. 5 illustrates a cross-sectional view a ski assembly including the bracket 142, the ski body 138, the wear bar 154, and the glide member 270. The wear bar 154 is mounted to the ski body 138 through the bolts 258. As seen in FIG. 5, the glide member 270 functions as an extension of the keel 146 in predetermined areas to guide the wear bar 154 and therefore guide the ski 100. At least a portion of the glide member 270 is disposed below the wear bar 154 and helps keep the wear bar 154 from entering ruts and tracks formed by other snow vehicles.

FIGS. 6a and 6b show the illustrated embodiment of the glide member 270 in greater detail. The overall shape of the glide member can be seen to include the forward raised portion 276, the lower bent portion 274, and the U-shaped cutout section 278 in the illustrated embodiment. The U-shaped cutout section helps secure and position the glide member 270 relative to the wear bar 154 allowing the glide member to be centered with respect to the wear bar 154.

Figure 7:
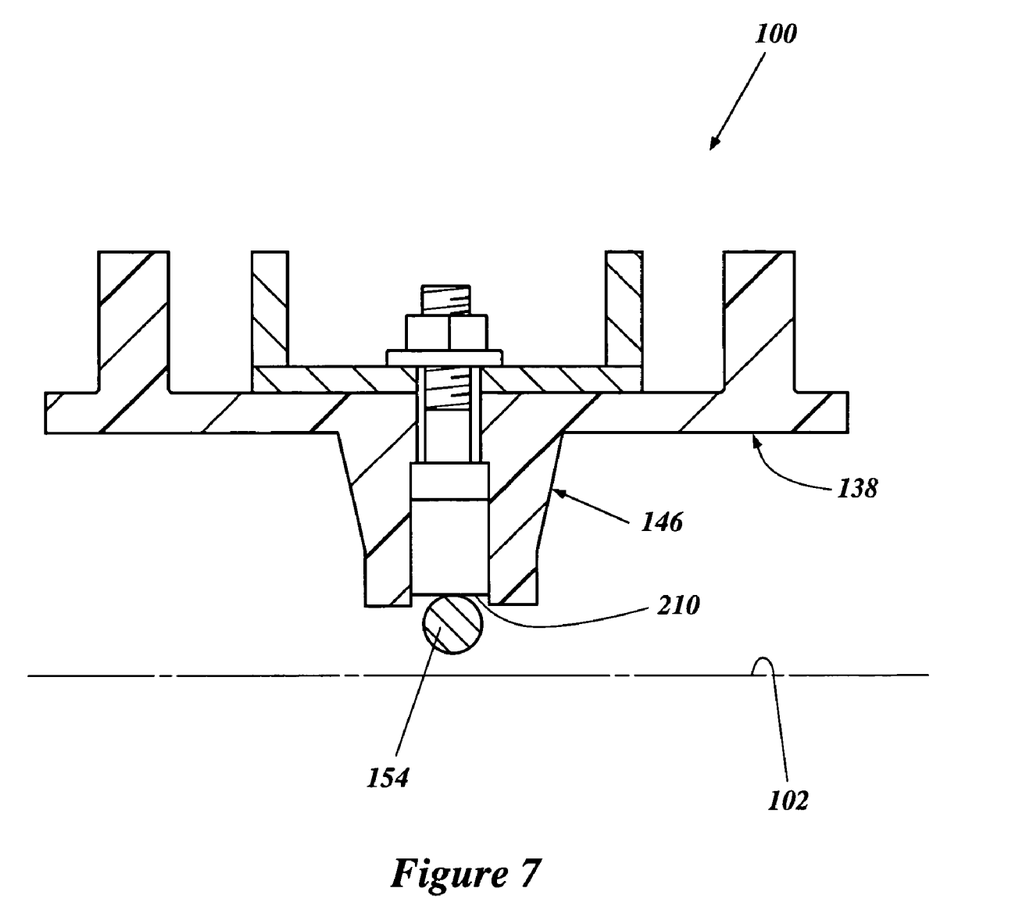
FIG. 7 is a cross-section view of the steering ski of FIG. 4 taken along the section plane indicted by the line 7-7 in FIG. 3.

FIG. 7 illustrates a cross-sectional view of the ski assembly and, more particularly, the wear bar 154 just behind the glide member relative to the snow surface 102 under one exemplifying surface condition. The wear bar 154 is positioned above the snow surface 102 due to the position of the glide member 270. The glide member places the wear bar 154 in a position above the snow surface to inhibit the wear bar 154 from entering preformed ruts and track on a hard surface conditions (e.g., compacted snow).

The glide member 270 can be made of metal, plastic, a composite, or any material of a suitable strength. The glide member can be fastened to the lower side of the ski body 138, to the keel 146, or the wear bar 154 through for example, but not limited to various fasteners or welding. As best understood from FIG. 2, the glide member 270 is welded to the wear bar 154 in the illustrated embodiment.

FIGS. 8-11 illustrate another preferred embodiment of the present invention. In this embodiment, at least one glide member is unitarily formed with the keel 146. Where appropriate, like reference numerals have been used to indicate like components and structure between the embodiments illustrated in FIGS. 2-7 and in FIGS. 8-11.

Figure 8:
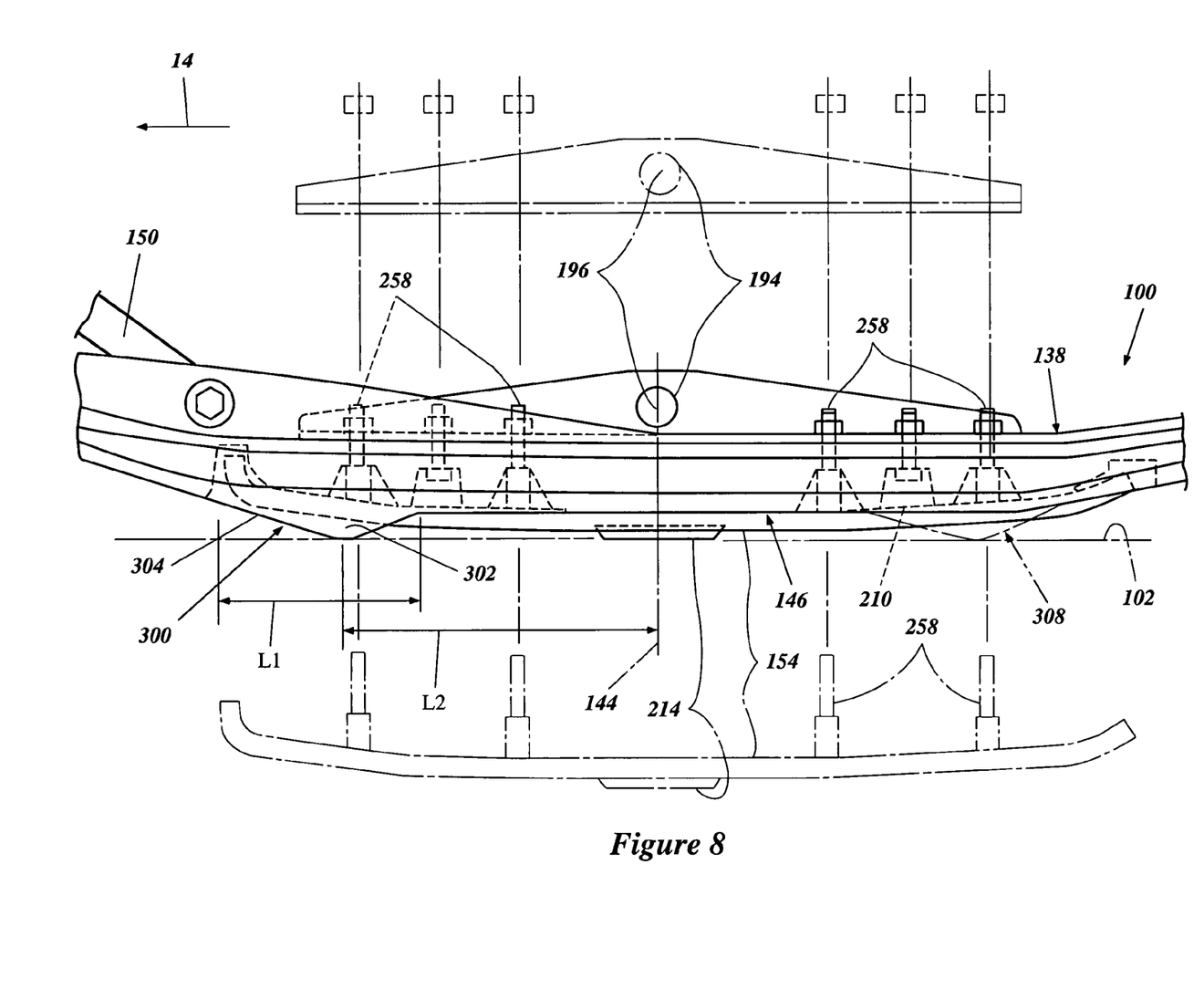
FIG. 8 is an exploded side elevation view of a steering ski configured in accordance with another preferred embodiment of the present invention.

The integral glide member 300 comprises all the advantages of the glide member 270 from the previously explained embodiment including improving steering and handling of the snowmobile 10 by inhibiting the wear bar 154 from entering snow tracks formed by other snowmobiles. That is, the integrally formed glide member 300 inhibits the wear bar 154, and therefore the ski 100, from entering snow vehicle tracks.

The integral glide member 300 is curved downward to project away from the lower side of the ski body 138 at a lowest section 302. A raised projecting surface 304 can be advantageously positioned in the direction of forward travel of the ski 100. The lowest section 302 of the integral gliding member 300 can be at least as low as the lowest surface of the wear bar 154. The integral gliding member 300 preferably surrounds the wear bar 154 and preferably is wide as the width of the keel 146. Predetermined angles also dictate the form of the integral glide member 300 will be described below.

Figure 9:
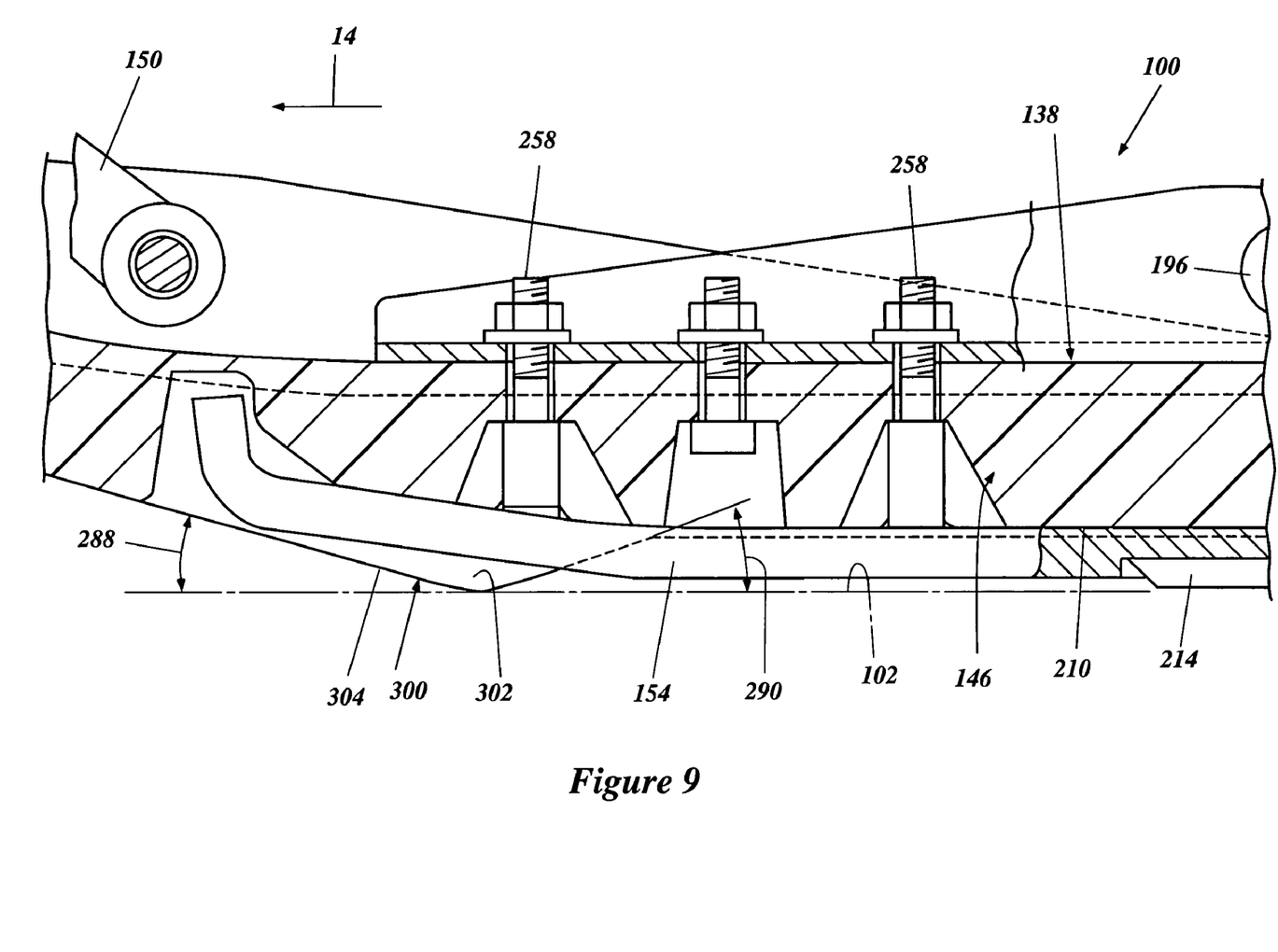
FIG. 9 is an enlarged sectional view of a forward portion of the steering ski illustrated FIG. 8.
Figure 10:
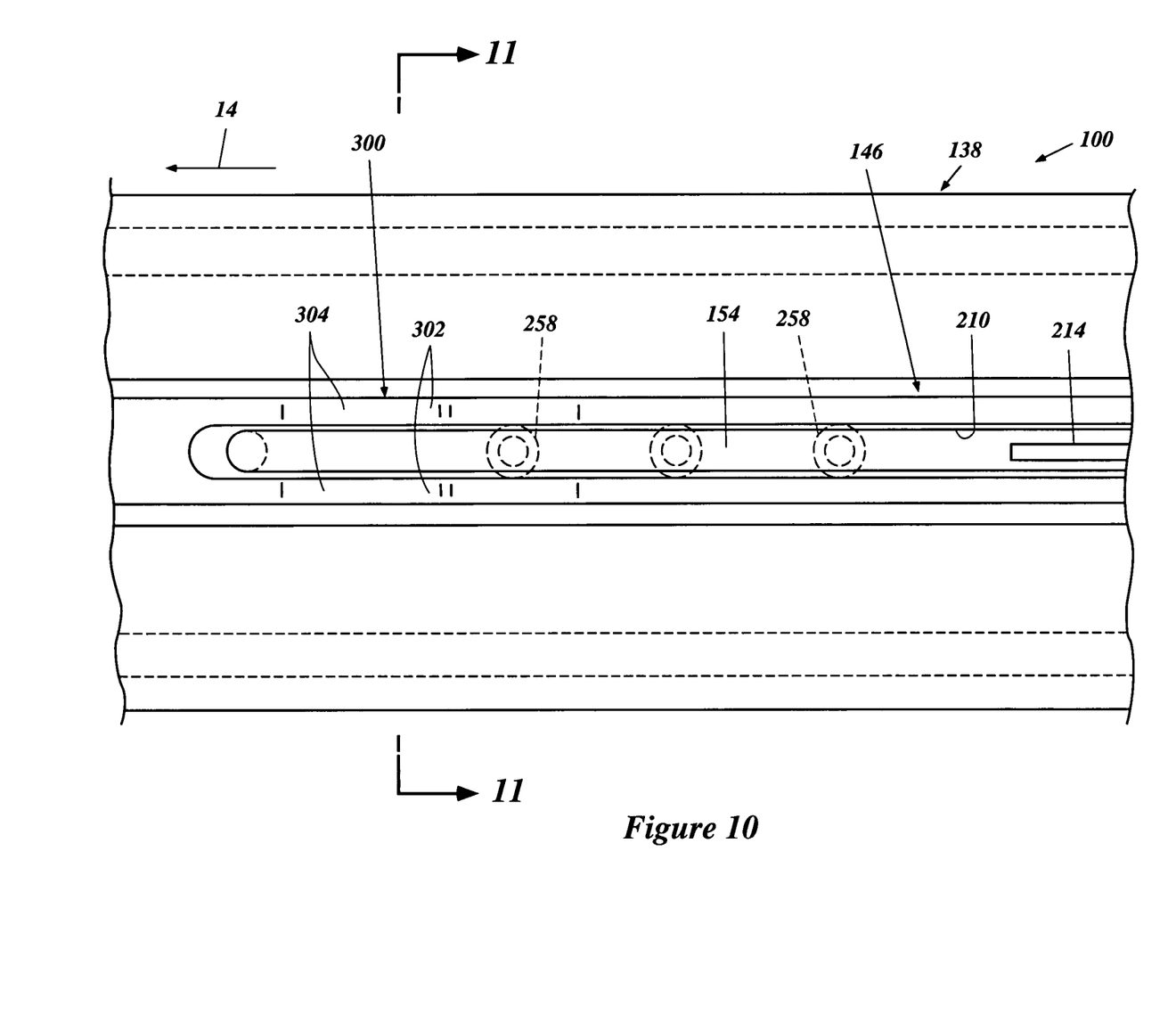
FIG. 10 is an enlarged bottom plan view of the steering ski shown in FIG. 9.

The position of the integral glide member 300 can vary; however, an example of an integral gliding member position can be seen in FIGS. 8-10. The lowest section 302 of the integral gliding member 300 can be located at the distance L2 from the lowest section 302 of the integral glide member 300 to the perpendicular axis 144. The overall length L1 of the integral glide member 300 can vary from one quarter of the predetermined distance L2 to one half of the distance L2.

As with the above-described embodiment, two predetermined angles, 288 and 290 preferably dictate the overall shape of the integral glide member 300. The first predetermined angle 288 can position the forward portion of the glide member 270 in an upward direction. The second predetermined angle 290 can position the rearward portion of the integral glide member 300 in an upward direction. Both predetermined angles 288 and 290 can be seen in FIG. 9. Preferably the angle 288 is less than the angle 290, i.e. (288<290). The predetermined angles 288 and 290 along with the mounting location and overall shape of the integral glide member 300 provide the snowmobile 10 with improved handling characteristics.

An integral rear glide member 308 can be positioned on the lower side of the ski body 138 to the rear of the perpendicular axis 144 in addition to the front integral glide member 300 or without the front integral glide member 300. The integral rear glide member 308 can be the same size and shape or differ in size and shape from the front integral glide member 300.

Figure 11:
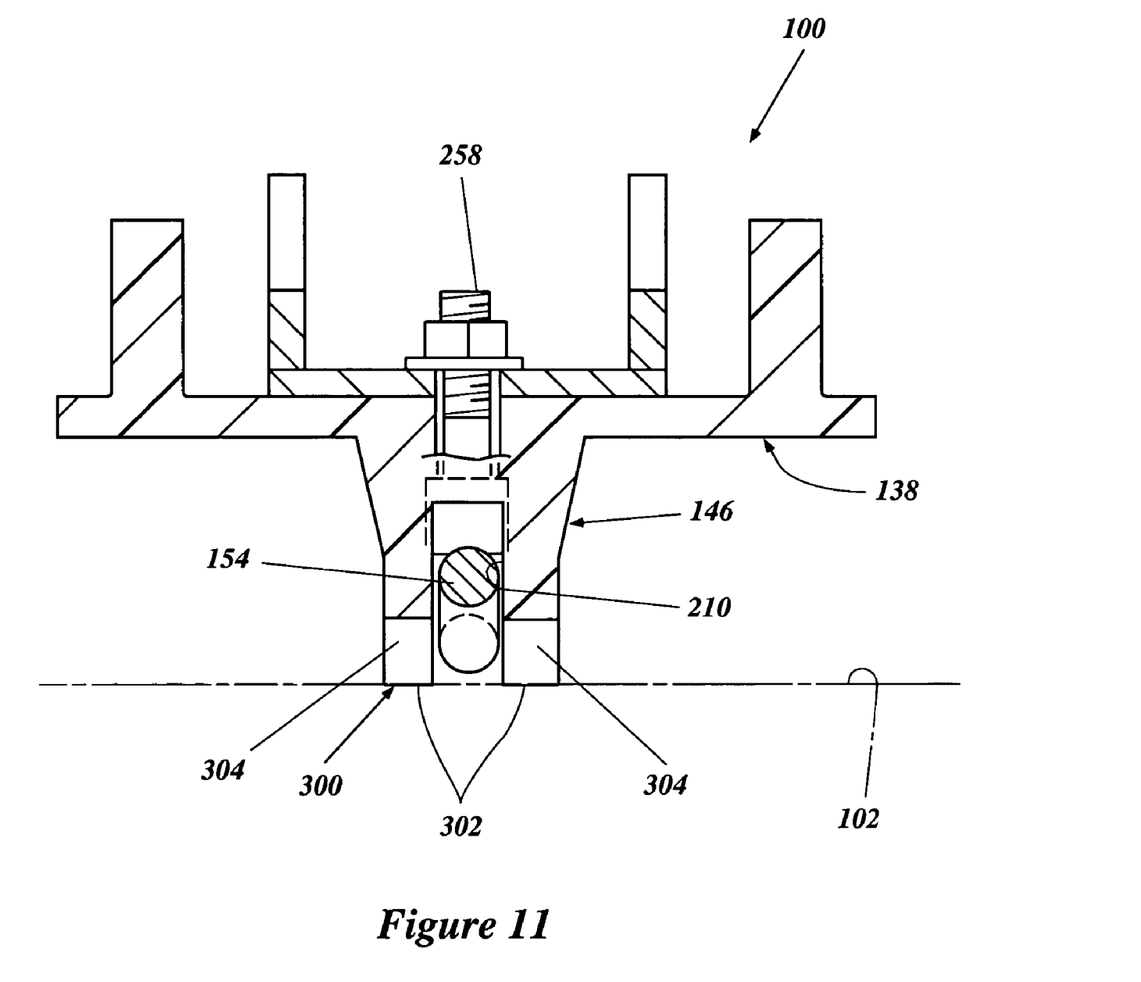
FIG. 11 is a cross-sectional view of the steering ski of FIG. 10 taken along the section plane indicated by the line 11-11 in FIG. 10.

FIG. 11 illustrates a cross sectional view a ski assembly including the bracket 142, the ski body 138, the wear bar 154, and the integral glide member 300. The keel 146 is mounted to the ski body 138 through the bolts 258. As seen in FIG. 11, the integral glide member 300 is an extension of the keel 146 in a predetermined area to guide the wear bar 154 and therefore guide the ski 100. At least a portion of the integral glide member 300 is disposed below the wear bar 154 and helps keep the wear bar 154 from entering ruts and tracks formed by other snow vehicles.

FIG. 11 further illustrates the position of the wear bar 154 with respect to the snow surface 102 just behind the front integral glide member 300. The wear bar 154 is positioned, at least under some operating condition, above the snow surface 102 due to the position of the integral glide member 300.

The integral glide member 300 can be made of metal, plastic, a composite, or any material of a predetermined strength and integrally formed with or imbedded in the ski body 138 to form a unitary structure.

Thus, the glide member can provide a desired response to one or more operating conditions, such as the snow quality and surface condition. The glide member can advantageously provide for a rider's improved steering stability and handling. Furthermore, the gliding member can help reduce instances of darting, which makes travel more stable and enjoyable. Thus, improved ski characteristics can be obtained through a glide member. Such characteristics can provide better handling, more stable running, and reduced steering load on the handlebar assembly 44.

Although the present invention has been described in terms of certain preferred embodiments, other embodiments apparent to those of ordinary skill in the art also are within the scope of this invention. Thus, various changes and modifications may be made without departing from the spirit and scope of the invention. Moreover, not all of the features, aspects and advantages are necessarily required to practice together in any particular embodiment or application. Accordingly, the scope of the present invention is intended to be defined only by the claims.

What is claimed is:

1. A ski for a snow vehicle, the ski comprising a ski body having a generally horizontal bottom surface that contacts the snow when the ski is in use, a ski mounting bracket located on a top side of the ski body, the ski mounting bracket defining at least in part a bracket pivot point wherein the ski pivots about the ski mounting bracket, a wear bar disposed on the bottom side of the ski body, at least one glide member also disposed on the bottom side of the ski member, and a keel, the glide member being positioned at least as low as the lowest most part of the wear bar, the glide member being wider than a portion of the wear bar next to the glide member, the entire glide member being disposed either forward or rearward of the bracket pivot point, at least a portion of the glide member having a width generally as wide as the width of an adjacent portion of the keel and extending beyond the width of the wear bar.

2. The ski as set forth in claim 1, wherein the glide member is disposed forward of the bracket pivot point.

3. The ski as set forth in claim 1, wherein the glide member is disposed rearward of the bracket pivot point.

4. The ski as set forth in claim 1 additionally comprising another glide member, one glide member being disposed forward of the bracket pivot point and the other glide member being disposed rearward of the bracket pivot point.

5. The ski as set forth in claim 1, wherein at least one surface of the glide member is angled in a downward direction away from the ski horizontal surface.

6. The ski as set forth in claim 5, wherein the glide member has a length that is between one quarter and one half the distance between a lowest-most point of the glide member and a center of the pivot point.

7. The ski as set forth in claim 1, wherein the glide member is detachable from the ski body.

8. The ski as set forth in claim 1, wherein the glide member is unitarily formed with the ski body.

9. The ski as set forth in claim 1, wherein the glide member is adjustable independently of the ski body.

10. The ski as set forth in claim 1, wherein the keel extends at least partially along the generally horizontal surface of the ski body, the keel having a lengthwise recess that extends along a keel lower surface, and at least a portion of the wear bar is disposed within the recess in the keel.

11. The ski as set forth in claim 1 additionally comprising a cleat extending downwardly from an underside of the wear bar.

12. The ski as set forth in claim 1, wherein the glide member has vertically extending side portions, and the wear bar is captured between the side portions of the glide member.

13. The ski as set forth in claim 1, wherein the glide member has a length of between one quarter and one half of a distance between a lowest-most point of the glide member and a center of the pivot point.

14. A ski system for a snow vehicle, the ski comprising at least one steerable ski body positioned below a front portion of the snow vehicle, the ski body having a generally horizontal bottom surface that contacts the snow when the ski is in use, a ski mounting bracket located on a top side of the ski body, the ski mounting bracket defining at least in part a pivot point, the ski being attached to the snow vehicle through a front suspension member at the pivot point, a wear bar disposed on the bottom side of the ski body, and at least one glide member also disposed on the bottom side of the ski body, the glide member having a length of between one quarter and one half of the distance between a lowest-most point of the glide member and a center of the pivot point, the glide member being wider than a portion of the wear bar lying next to the glide member.

15. The ski system as set forth in claim 14, wherein the glide member is positioned at least as low as the lowest-most part of the wear bar.

16. The ski system as set forth in claim 14, wherein the glide member is disposed forward of the bracket pivot point.

17. The ski system as set forth in claim 14, wherein the glide member is disposed rearward of the bracket pivot point.

18. The ski system as set forth in claim 14 additionally comprising another glide member, one glide member being disposed forward of the bracket pivot point and the other glide member being disposed rearward of the bracket pivot point.

19. The ski system as set forth in claim 14, wherein at least one surface of the glide member is angled in a downward direction away from the ski horizontal bottom surface.

20. The ski system as set forth in claim 12, wherein the glide member has a pair of opposing sides, and the wear bar is positioned between the sides of the glide member.

21. The ski system as set forth in claim 20, wherein the sides of the glide member extend upwardly and capture the wear bar therebetween.

22. A snowmobile comprising an engine, a transmission, a drive track, a steering mechanism, and a ski, the ski having a ski body with a generally horizontal bottom surface that contacts snow when the ski is in use, a ski mounting bracket located on a top side of the ski body, the ski mounting bracket defining at least in part a pivot point wherein the ski pivots about the ski mounting bracket, a wear bar extending below the bottom surface of the ski body, a first means for preventing at least a portion of the wear bar from entering depressions in a snow surface, said first means extending directly below the wear bar and being positioned entirely either forward or rearward of the bracket pivot point, and a second means for preventing the wear bar from entering depressions in the snow surface, one of said first and second means being entirely disposed forward of the bracket pivot point and the other one of said first and second means being entirely disposed rearward of the bracket pivot point.

23. The snowmobile as set forth in claim 22, wherein said first means is disposed forward of the ski bracket pivot point.

24. The snowmobile as set forth in claim 22, wherein said first means is disposed rearward of the ski bracket pivot point.

25. The snowmobile as set forth in claim 22, wherein said first means is wider than a portion of the wear bar positioned next to said first means.

26. A ski for a snow vehicle, the ski comprising a ski body having a generally horizontal bottom surface that contacts the snow when the ski is in use, a ski mounting bracket located on a top side of the ski body, the ski mounting bracket defining at least in part a pivot point where the ski is attached to the snow vehicle, a wear bar disposed on the bottom side of the ski body, and at least one glide member also disposed on the bottom side of the ski member, the glide member being positioned at least as low as the lowest most part of the wear bar, the glide member being wider than a portion of the wear bar next to the glide member, the entire glide member being disposed either forward or rearward of the bracket pivot point, wherein at least one surface of the glide member is disposed directly beneath at least a portion of the wear bar and is angled in a downward direction away from the ski horizontal surface.

27. A ski for a snow vehicle, the ski comprising a ski body having a generally horizontal bottom surface that contacts the snow when the ski is in use, a ski mounting bracket located on a top side of the ski body, the ski mounting bracket defining at least in part a pivot point where the ski is attached to the snow vehicle, a wear bar disposed on the bottom side of the ski body, and at least one glide member also disposed on the bottom side of the ski member, the glide member being positioned at least as low as the lowest-most part of the wear bar, the glide member being wider than a portion of the wear bar next to the glide member, the glide member having a length that is between one quarter and one half the distance between a lowest-most point of the glide member and a center of the pivot point, the entire glide member being disposed either forward or rearward of the bracket pivot point, wherein at least one surface of the glide member is angled in a downward direction away from the ski horizontal surface.

* * * * *

UNITED STATES PATENT AND TRADEMARK OFFICE
CERTIFICATE OF CORRECTION

PATENT NO.        : 7,413,197 B2                                         Page 1 of 1
APPLICATION NO.   : 10/601093
DATED             : August 19, 2008
INVENTOR(S)       : Haruna et al.

It is certified that error appears in the above-identified patent and that said Letters Patent is hereby corrected as shown below:

On the Title Page, item 75 column 1 (Inventors), line 1, please delete "Takahik" and insert therefore, -- Takahiko --.

Signed and Sealed this

Twenty-fourth Day of February, 2009

JOHN DOLL
*Acting Director of the United States Patent and Trademark Office*